April 8, 1941.    J. KALES    2,237,937
TRACTOR
Filed April 8, 1939

Inventor
JOSEF KALES
By
Attorneys

Patented Apr. 8, 1941

2,237,937

UNITED STATES PATENT OFFICE 2,237,937

TRACTOR

Josef Kales, Stuttgart, Germany, assignor to Dr. ing. h. c. F. Porsche, K.-G., Stuttgart-Zuffenhausen, Germany, a company of Germany Application April 8, 1939, Serial No. 266,737
In Germany April 20, 1938

13 Claims. (Cl. 180—12)

This invention relates to an improved Tractor, and more particularly to a tractor which is divisible into separate steerable and power-driven units.

An object of this invention is the provision of a novel tractor capable of more general and universal use than those now known in the art.

Another object of this invention is the provision of a tractor which is adaptable as a steerable, driven load-carrying vehicle, or as a power unit under the control of a following foot attendant.

A further object of this invention is the provision of a separable tractor which may be connected and disconnected with a minimum amount of time and effort.

A specific object of this invention is the provision of a tractor formed of a power-driven unit releasably connected to a steerable unit, in which the power-driven unit may be used by itself as a self-contained source of power.

Further objects and advantages of this invention will be apparent from the consideration of the specification as illustrated by the accompanying drawing of possible embodiments of the invention in which drawing.

Figure 1:
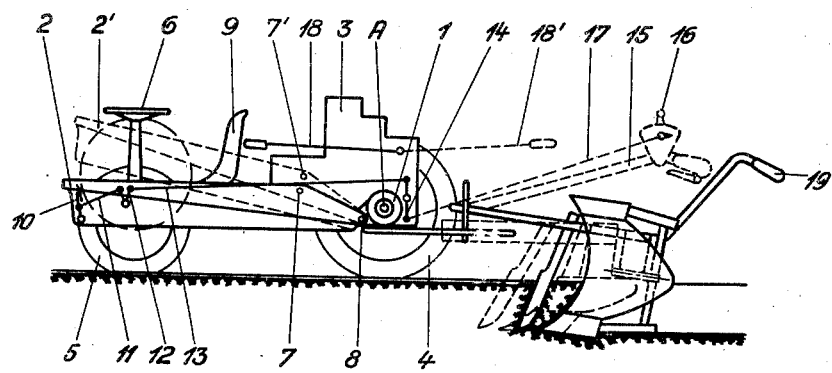
Fig. 1 is a side view of a combined tractor formed in accordance with one embodiment of this invention.

A preferred form of the novel combined tractor formed in accordance with the principles of this invention is illustrated in Fig. 1, wherein the power or driving unit (shown by itself in Fig. 2) is designated as 1, and the separate steerable unit is designated as 2. The driving unit 1 is provided with a power plant and associated control parts 3 which drive the wheels, one of which is indicated at 4, through suitable means (not shown). The steerable unit 2, on the other hand, is provided with suitable running wheels, one of which is indicated at 5, which is controlled in any suitable manner (not shown) by the steering wheel 6. In the form of invention illustrated in Fig. 1 the steerable unit 2 has been indicated as provided with a pair of steerable running wheels, but it is to be considered as within the scope of this invention that a single steerable wheel may be used, in accordance with arrangements well known to those skilled in this art.

Figure 2:
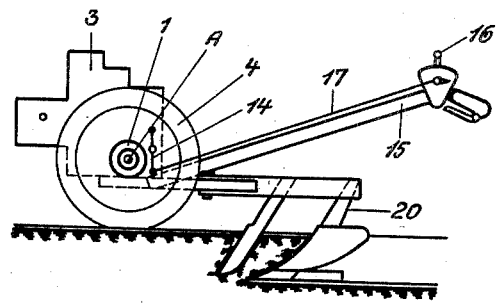
Fig. 2 is a side view of the driving unit of the tractor alone, shown by way of illustration in combination with certain attached parts.

In a preferred arrangement, the driving unit 1 and the steerable unit 2 are connected together at two points 7, 8, by any suitable means such, for example, as threaded bolts. It will be noted that the connecting points 7 and 8 are spaced apart at a substantial distance from one another; this produces a strong and rigid connection between the two units. It will be noted further, that the connecting point 7 is spaced at a substantial distance from the axis A of the driving wheel 4 of the unit 1; this provides a novel arrangement for facilitating initiation of the connection between the two units. When the two units are separated, it will be obvious that the forward part of the frame of the steerable unit will be supported at a distance from the ground by the running wheel or wheels 5. The rear of the frame will, however, rest directly upon the ground. If it is now desired to interconnect the two units, the unit 1 may be moved into suitable position and then rotated about the axis A of the driving wheel in a counterclockwise direction (as seen in Figs. 1 and 2) until the connecting point 7 on the unit 1 coincides with the connecting point 7 on the unit 2. Bolts or other suitable means are then inserted so that there will result a pivotal connection between the two units at this point. If, now, the driving unit 1 is rotated about the axis A in the opposite direction (clockwise, as seen in Figs. 1 and 2) the heavy steerable frame part will be easily raised until the connecting points 8 of the two units coincide. At that point the connection is completed and the two units will now be firmly interconnected with one another. It will be obvious that this method of interconnecting the two units saves the direct lifting of the relatively heavy rear end of the steerable frame part. Rotation of the driving unit 1 about the wheel axis A can be accomplished either by pressing on a suitable lever connected to the driving unit, such as a control handle, in which case the added leverage greatly aids in lifting the frame of the steerable unit, or, if the driving wheels 4 of the driving unit 1 are suitably locked or blocked, it is possible that raising of the steerable frame unit 2 can be accomplished through the power of the engine 3.

Control of the power unit 1 is preferably brought about through a system of links and levers, which will permit such control either from the steerable unit 2 or from a position rearward of the power unit 1, handy to the attendant of a plow or other device which may be pulled by the power unit. It will be seen from Fig. 1 that the steerable unit 2 is preferably provided with a seat 9 in the vicinity of the steering wheel 6, and a foot pedal 10 which, through a series of links and cranks, 11, 12 and 13 is connected to one end of a double-armed crank 14 which may, for example, actuate the clutch for the engine 3. The rod 13 is preferably connected to the one end of the crank 14 in a readily releasable manner, as for example, by means of a spring-pressed spherical connection, so that the connection and disconnection between these parts upon the joining or separating of the two tractor units can be quickly and easily accomplished. In order that control of the power unit 1 may just as readily be accomplished by a following foot attendant, suitable means may be provided on the plow handle 15. I have there indicated a hand lever 16 which is interconnected for actuation of the double-arm crank 14 through a wire 17. This wire is connected to the crank 14 in any suitable readily releasable manner. Another form of control which is readily accessible to either the driver of the steerable unit or to a following foot attendant is illustrated by the reversable control lever 18, indicated in its rearward position as 18'. This lever is adapted to effect control, such for example, as of the change-speed gearing, in either of its two extreme positions. Other control for the fuel supply, brakes, etc. can be formed in accordance with either of the two arrangements described above, or in any other suitable manner which will be obvious to those skilled in this art.

In Fig. 1 the tractor has been illustrated as adapted to pull a rotary plow 19, while in Fig. 2 the driving unit 1 is shown as connected to a rigid plow 20.

For certain purposes, as for example, in certain types of plowing, it is possible to pull the plow behind the assembled tractor, the operator sitting in the seat 9 of the steerable frame part 2, but in such cases it is often desirable that the first furrow be made with the operator at the rear to tend the plow. In order that a second person need not be present as a driver during the making of the first furrow and to save connecting and disconnecting of the two tractor units, these may be adjusted relatively to one another so that they will be connected at the point 7', as shown in Fig. 1. When connected and in this position the back part of the tractor, that is the steerable frame part 2 may be raised off the ground to the position 2' so that control of the entire tractor will be the same as if only the driving unit 1 were used. After the first furrow is completed the parts may be readjusted and connected at the point 7, the frame of the steerable part 2' pivoting relative to the driving unit 1 about the connecting point 8.

Figure 3:
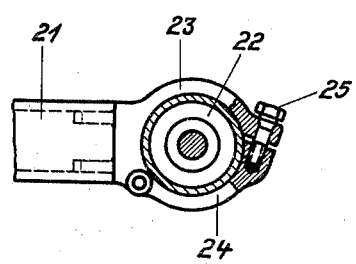
Fig. 3 is a cross-sectional view on an enlarged scale through the axle tube of the driving tractor unit illustrating a modified form of attaching means.

A further manner in which the two units of the tractor may be interconnected with one another is illustrated by the construction shown in Fig. 3. In this case the forward or steerable tractor unit 21 is mounted upon and about the axle tube 22 of the driving unit by means of a saddle-like extension 23, extending over and partly around the axle 2. The connection is completed through a lower semi-circular member pivoted to the steerable frame part and extended about the lower part of the axle tube 22. The members 23 and 24 can then be rigidly clamped about the entire axle tube through suitable means such as a threaded bolt 25.

The constructions illustrated and described above are capable of many modifications within the scope of those skilled in this art. The driving units can be so formed that the driving block is sprung relatively to the driving wheel or it may be formed unitarily with the axle tube. The steerable frame part may be sprung or unsprung as desired. The steerable frame may, moreover, be formed in any one of a number of well known manners, as for example, it may be formed of a system of beams, it may be fan-shaped or consist solely of a central longitudinal beam in which latter case, a single rigid clamping between the single longitudinal beam and the driving unit would suffice.

The constructions which have been described are not only extremely advantageous in use, particularly for agricultural purposes, but by being separable, simplify extremely the cost of production. The resulting tractor is simple to produce, easy to maintain in repair, easily connected and disconnected, and capable of handling the heaviest loads and largest agricultural machinery.

It will therefore be seen that I have provided a construction which satisfies the objects enumerated above and one which constitutes a valuable advance in the art. While I have shown the invention in certain physical embodiments it is to be understood that modifications in the structure shown may be made by those skilled in this art without departing from my invention as expressed in the following claims:

1. A tractor comprising, in combination, a pair of separable frame units, a running wheel and steering means for said wheel mounted on one of said units, a source of power, means for controlling said source of power, a pair of wheels and means interconnecting said wheels with said source of power all mounted on the other unit, and means for releasably, rigidly interconnecting said units.

2. The combination according to claim 1, in combination with control means on said one unit, and means for releasably connecting said control means with the power control means of said other unit.

3. The combination according to claim 1, in combination with a handle, means for releasably connecting said handle to said other unit, control means on said handle, and means for releasably connecting said control means with the power control means of said other unit.

4. The combination according to claim 1, in which at least part of said last means is positioned at a substantial distance from the axis of the wheels of the other unit.

5. The combination according to claim 1, in which said last means includes a plurality of connecting points of said one unit, spaced at a substantial distance from the axis on the wheels of the other unit, and means for alternatively interconnecting said units at one of said connecting points, whereby the angular relationship between said units may be varied.

6. The combination according to claim 1, in combination with tractor control means reversably mounted on said other unit to effect control from said one unit or from a position rearwardly of said other unit.

7. The combination according to claim 1, in combination with a plow, means for releasably connecting said plow to said other unit, a handle on said plow, control means on said handle, and means for releasably interconnecting said control means with the power control means on said other unit.

8. A tractor comprising, in combination, a pair of separable frame units, a running wheel and steering means for said wheel mounted on one of said units, a source of power, means for controlling said source of power, an axle tube, a pair of wheels supported on said axle tube, and means interconnecting said wheels with said source of power mounted on the other of said units, and means for releasably connecting said one unit through the axle tube of the other unit.

9. The combination according to claim 8, in which said last means comprises a member rigid with said one unit extending over and partially about said axle tube, a second member hinged to said one unit, and means for clamping said first and second members together with said axle tube in between.

10. A tractor comprising, in combination, a pair of separable frame units, a pair of front wheels and steering means for said wheel mounted on one of said units, a source of power, means for controlling said source of power, a second pair of wheels and means interconnecting said wheels with said source of power all mounted on the other unit, and means for releasably rigidly interconnecting said units at a plurality of points, one of which extends along an axis substantially parallel to the axis of said second pair of wheels.

11. A tractor comprising, in combination, a pair of separable frame units, a pair of running wheels and complete self-contained steering apparatus for said running wheels, including a steering wheel, mounted on one of said units, a source of power, means for controlling said source of power, a second pair of wheels and means interconnecting said second pair of wheels to said source of power all mounted on the other unit, and means for releasably rigidly interconnecting said units.

12. The combination according to claim 11, in combination with a driver's seat on said one unit positioned in juxtaposition to said steering wheel.

13. The combination according to claim 1, in combination with a driver's seat on said one unit positioned in juxtaposition to said steering means, and tractor control means reversably mounted on said other unit for moving to a position adjacent said driver's seat or rearwardly of said other unit.

JOSEF KALES.